Sept. 13, 1966 L. F. BARNUM 3,272,158
MOLDED PALLET
Filed June 16, 1964
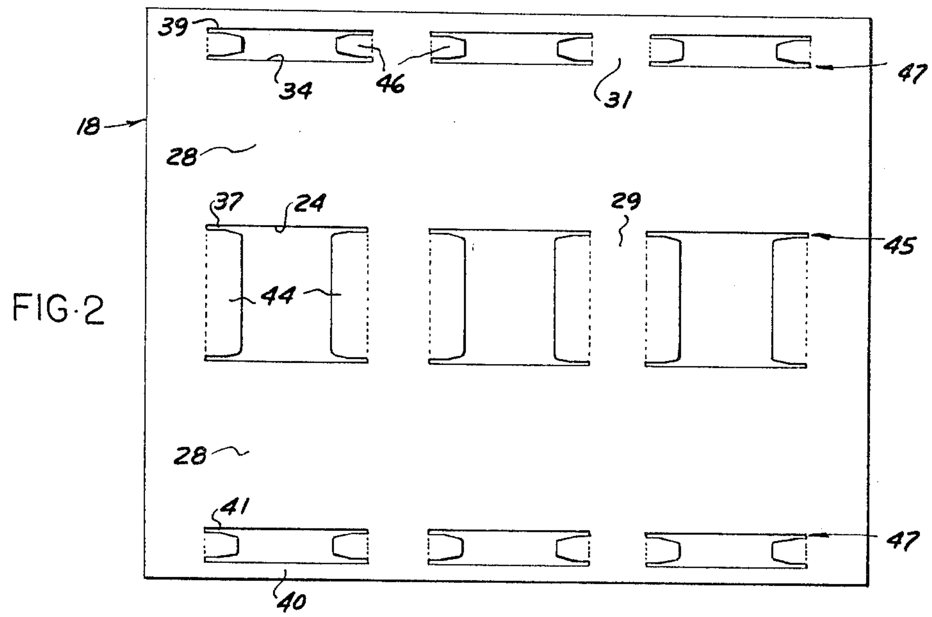
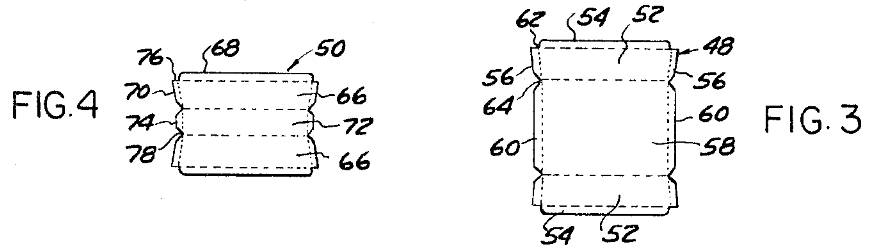
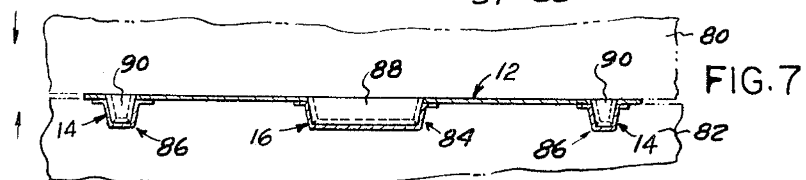
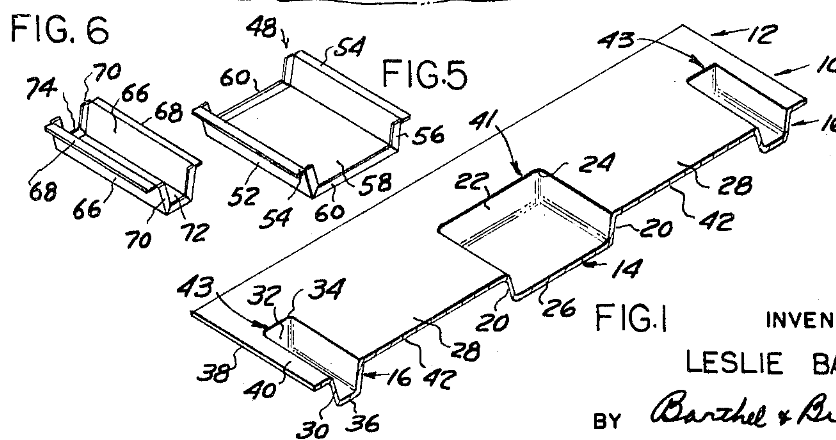
INVENTOR
LESLIE BARNUM
BY Barthel & Bugbee
ATTORNEYS 3,272,158
Patented Sept. 13, 1966

3,272,158

MOLDED PALLET

Leslie F. Barnum, 19345 Keating St., Detroit, Mich.

Filed June 16, 1964, Ser. No. 375,448
4 Claims. (Cl. 108—51)

This application is a continuation-in-part of my copending application Serial No. 312,435, filed Sept. 30, 1963, for Molded Pallet, now abandoned.

This invention relates to pallets and, in particular, to molded pallets.

Hitherto, wooden pallets have been used for holding stacked articles, such as sheet metal stampings, not only during storage and transfer by fork-lift truck from place to place within the factory but also for shipment in freight cars, semi-trailers and the like. These pallets are used in large quantities, especially in the automobile industry, one of the largest automobile manufacturing companies using 20,000 pallets per day. The returning of the empty pallets to the factory from which originated the stacked articles, such as fenders, windshields and carpets, as well as the space required for storage of these bulky wooden pallets, has been a serious problem, to the extent that the return shipment of wooden pallets presently costs as much as they are worth. One particular problem with respect to such pallets is the necessity of providing feet on them at least four inches in height in order to accommodate the four-inch rollers on the ends of the forks of the fork-lift trucks used in handling the loaded pallets. Attempts have previously been made to mold pallets from plastic-impregnated paper or fabric in shapes of undulating or "Wall-of-Rome" crenelated cross-section in order to provide such feet, but these have failed by collapsing as the loading proceeded and the weight of them increased beyond the point which they were able to sustain.

The present invention solved these problems successfully by providing a disposable molded laminated paper pallet with molded box-shaped feet depending from a laminated paper base sheet or plate, the feet being separated from one another and from the edge of the base sheet or plate by bridge portions which prevent collapsing under load. At the same time, the molded bridged plastic-impregnated paper pallets are so inexpensive to manufacture that they may be disposed of at the receiving point without the necessity for returning them to the original shipment point. At the same time, the pallets of the present invention have hollow mating box-shaped feet which enable the empty pallets to be nested and stacked in compact piles, thereby minimizing the storage space required in contrast to the excessive storage space required for the prior wooden pallets.

Accordingly, one object of this invention is to provide a disposable molded pallet of sheet material having multiple depending box-shaped feet with intervening channels or tunnels into which the forks of fork-lift trucks may be inserted for lifting or transporting, the opposite ends of these feet being interconnected by bridge portions which prevent their collapsing under reasonable loads ordinarily encountered in shipments in which pallets are used.

Another object is to provide a molded plastic-impregnated pallet of the foregoing character which is made from laminated plastic-impregnated paper, thereby imparting to the pallet lightness combined with strength.

Another object is to provide a molded pallet of the foregoing character wherein the hollow box-shaped feet have tapered side walls enabling the feet of adjacent pallets to mate with one another so as to permit the pallets to be stacked in compact piles in a minimum space.

Another object is to provide a molded pallet of the foregoing character wherein the base sheet from which the hollow box-shaped feet depend has tabs extending down into the feet against the walls thereof and adhesively secured thereto so as to firmly secure the feet to the base sheet or plate and at the same time strengthen the construction and further enhance its rigidity.

Another object is to provide a process of making a molded plastic-impregnated pallet of sheet material including the cutting of a base sheet or plate blank from sheet material having feet openings with tabs therein, the cutting of feet blanks from sheet material, the bending of the feet blanks into hollow open-topped box-shaped form and the securing of the feet to the base or sheet or plate by heat-pressing these against one another while forcing the base sheet tabs into inseparable adhesive engagement with walls of the feet.

Other objects and advantages of the invention will become apparent during the course of the following description of the accompanying drawings, wherein:

FIGURE 1 is a fragmentary perspective view upon a reduced scale, looking from above, of a portion of a completed disposable molded pallet according to one form of the invention, showing the open-topped box-shaped feet depending from the base sheet or plate;

FIGURE 2 is a top plan view, upon a reduced scale, of a base sheet or base plate blank forming one of the components of the molded pallet;

FIGURE 3 is a top plan view of a central foot blank from which the central feet are formed;

FIGURE 4 is a top plan view of a side foot blank from which the side feet are subsequently formed;

FIGURE 5 is a top perspective view of a preformed central pallet foot;

FIGURE 6 is a top perspective view of a preformed side pallet foot; and

FIGURE 7 is a fragmentary vertical section taken in the cut-off plane of FIGURE 1 through the upper and lower dies of a molding press while the end flaps of the base sheet openings are being pressed downward against the end tabs of the pallet feet and while the pallet feet are being secured to the base sheet or plate.

Referring to the drawing in detail, FIGURE 1 shows an end portion of a molded sheet material pallet, generally designated 10, according to one form of the invention as consisting generally of a plate-shaped base component or base sheet 12 which is conveniently but not necessarily of rectangular outline, and from which depends a set of open-topped box-shaped axially-spaced central or intermediate hollow pallet feet 14 and two sets of similarly-shaped but narrower side feet 16, the locations in the finished pallet being determined by and located according to the showing of the base sheet blank, generally designated 18, as shown in FIGURE 2. The longitudinal axes of the central feet 14 and side feet 16 are disposed in laterally-spaced parallel relationship.

Each of the central feet 14 is of truncated V-shaped cross-section and is provided with downwardly-and-inwardly-inclined side walls 20 (FIGURE 1) and downwardly-and-inwardly-inclined end walls 22 (only one of which is shown in FIGURE 1), the side and end walls 20 and 22 depending from the edges of a rectangular opening 24 in the base sheet 12 and being connected to one another by a horizontal bottom wall 26 joining their lower ends. Each of the side feet 16 is conveniently of the same length as each central foot 14, but is considerably narrower laterally, the additional widths of the central feet 14 being advisable in order to narrow the span of the lateral bridge portions 28 of the base sheet 12 extending between the central sheet 14 and side feet 16. The central and side feet 14 and 16 of each set are also separated from one another by longitudinal bridge portions 29 and 31 respectively.

Each of the side feet 16 is also of truncated V-shaped cross-section and is similarly provided with downwardly-and-inwardly-inclined side walls 30 and downwardly-and-inwardly-inclined end walls 32 depending from the edges of a somewhat narrower rectangular opening 34 and joined to one another by a horizontal bottom wall 36 which is in substantially the same plane or on substantially the same level as the bottom wall 26 of each central foot 14 but is narrower in width than the latter. Between the side feet 16 and the lateral edges 38 of the base sheet 12 extend edge portions or peripheral portions 40. The spacing of the side feet 16 from the central feet 14 provides two elongated parallel channel-shaped recesses or tunnels 42 for the reception of the forks of a conventional fork-lift truck (not shown). These divide the feet into one intermediate set 41 of wide central feet 14 and two outer sets 43 of narrow side feet 16 parallel to one another. Similarly, the approximately H-shaped central or intermediate large openings 24 and the approximately H-shaped outer narrow openings 34 of the base sheet are disposed in one intermediate set 45 of large openings 34 and two outer sets 47 of narrow outer openings 24 also disposed parallel to one another.

In the process of manufacture of the molded pallet 10, of FIGURE 1, multiple sheets of suitable material, such as Kraft paper or other dense wood fiber sheet material, are unwound in strip form from rolls of suitable width, for example 41 inches, but corresponding to the width desired for the finished pallet, and of any suitable thickness, such as 0.050 inch, and passed continuously through a bath of suitable synthetic plastic material in a liquid state, for example a fast molding polyester resin. A thermoplastic phenolic resin may also be employed for such impregnation. The thus-impregnated strip is cut into single-ply base sheet blanks 18 of suitable length, depending upon the lengths desired for the finished pallets 10, for example 33-inch lengths. The sheets are then placed between blanking dies which simultaneously cut out the large and small rectangular openings 24 and 34 which will eventually border the central and side feet 14 and 16 respectively. At the same time, the opposite lateral edges of the openings 24 and 34 are provided with opposite inwardly-facing end flaps 44 and 46 respectively cut out by the blanking dies in the same blanking operation but with their opposite ends spaced away from the adjacent edges of their openings 24 and 34 to provide slots or notches 37 and 39 therebetween. The blanking operation also determines the spacing of the large and small rectangular openings 24 and 34 and, consequently, the ultimate location of the central and side feet 14 and 16 respectively, as well as the widths of the bridge portions 28 which will ultimately determine the widths of the fork tunnels 42 for the fork lift truck to be used in handling the pallets 10. The single-ply base sheet blanks 18 thus blanked out are then stacked and by heat laminated to the number of layers or plies giving the thickness required to carry the load.

Meanwhile, in two other blanking operations between blanking dies of different sizes, the single-ply blanks 48 and 50 for the central and side feet 14 and 16 have been cut out from sheet stock of similar thickness similarly impregnated with the same plastic material. Each single-ply central foot blank 48 is provided with opposite side wall flaps 52 (FIGURE 3) carrying edge and end tabs 54 and 56 respectively. The bottom wall portion 58 between the side wall flaps 52 is also provided with end tabs 60, the blank 48 being notched as at 62 and 64 between the various edge and end tabs 60, 54 and 56 for greater convenience in subsequent folding along the fold lines indicated by the dotted lines in FIGURE 3. Similarly, each single-ply side foot blank 50 is provided with opposite side wall flaps 66 (FIGURE 4) carrying edge and end tabs 68 and 70 respectively. The bottom wall portion 72 between the side wall flaps 66 is also provided with end tabs 74, the blank 50 being notched as at 76 and 78 between the various edge and end tabs 68, 70 and 74 for greater convenience in subsequent folding along the fold lines indicated by the dotted lines in FIGURE 4. The single-ply central and side foot blanks 48 and 50 are then stacked and thus laminated by pressing them between hot platens to the number of layers or plies necessary to give the requisite thickness needed to carry the load. The plastic impregnation causes the various plies of both the base sheet blanks 18 and the center and side foot blanks 48 and 50 to adhere firmly to one another throughout the subsequent uniting operations. The central and side foot blanks 48 and 50 are punched out in progressive die sets and at the same time are scored along the dotted fold lines indicated in FIGURES 3 and 4 and then preformed into shallow open-topped box form as preformed feet 14 and 16 (FIGURES 5 and 6) with laterally-extending opposite edge tabs 54 and 68 respectively.

The laminated multi-ply base sheet blanks 18 are then united with the central and side feet 14 and 16 between upper and lower heated dies 80 and 82 respectively (FIGURE 7) secured to the platen and bed of a conventional press (not shown) provided with means for heating the dies 80 and 82, such as by steam. The lower die 82 is provided with central and side die cavities 84 and 86 respectively corresponding to the locations of the central and side openings 24 and 34 in the base sheet blanks 18, but with side and end walls inclined in a manner similar to the inclinations of the side and end walls 20 and 22 of the central and side feet 14 and 16 respectively. An inclination of approximately five degrees has been found suitable in order that the finished pallets 10 will nest and stack easily for transportation or storage. Ordinarily a lamination consisting of three or four sheets to form the ultimate laminated blank has been found satisfactory, the sheet blanks being coined down by further compression so that a four-ply stack averaging 0.050 of an inch per sheet is compressed to 0.100 inch for the four-ply laminated blank.

The preformed central and side feet 14 and 16 are placed in the central and side recesses 84 and 86 of the lower die 82 with their opposite edge tabs 54 and 68 projecting laterally therefrom as shown in FIGURES 5 and 6. Then the multi-ply base sheet blank 18 is moved into place over them, so that the end flaps 44 and 46 of the central and side foot openings 24 and 34 are aligned with their respective preformed feet 14 and 16 and the tabs 54 and 58 lie adjacent the edges of the openings 24 and 34 at the opposite ends of the flaps 44 and 46. The upper die 80 is similarly provided with wide and narrow punches 88 and 90 respectively (FIGURE 7) aligned with the die cavities 84 and 86 in the lower die 82 and similarly configured, with due allowance for the thickness of the stock between them. The press is then operated so as to cause the upper die 80 to descend into mating relationship with the lower die 82. As the punches 88 and 90 descend into their respective die cavities 84 and 86, they push downward their respective end flaps 44 and 46 firmly into engagement with the adjacent end tabs 56, 60 and 70, 74 respectively of the preformed central and side feet 14 and 16 immediately beneath them. Since the dies 80 and 82 are heated, they cause the plastic impregnation to melt and effect secure adhesion of the edge tabs 54 and 68 to the base sheet 12 adjacent the edges of its respective openings 24 and 34 and of the flaps 44 and 46 to their respective end tabs 56, 60 and 70, 74 so as to render them inseparable from one another.

In the use of the invention, the load is placed upon the pallet 10 in a pile or stack. A fork-lift truck (not shown) is then moved to the thus-stacked pallet and its forks inserted in the two channels or tunnels 42 between the central and side feet 14 and 16. The elevating mechanism is then operated to lift the loaded pallet off the floor, whereupon the fork-lift truck is operated to convey the stacked or loaded pallet to its desired location, such as into a freight car or semi-trailer for transportation. As the ordinary railway freight car or box car is approximately 108 inches wide inside the car, the pallets 10 of 33-inch width can thus be accommodated in three rows side by side running lengthwise of the car. It is preferable to equip the floor of the car with parallel pairs of tracks of U-shaped cross-section having cross-sectional dimensions similar to the die cavities 84 and 86 (FIGURE 3). The feet 14 and 16 of the pallets 10 are seated in these tracks, which prevent lateral shifting of their loads during transportation. When the freight car reaches its destination, the loaded pallets are removed by means of a fork-lift truck by reversing the above-described procedure, and transported to their destinations. After the pallets are unloaded, they may be discarded or, if desired, compactly stacked by their nesting feet into a bundle of small dimensions and returned to their point of origin. During loading and also during transportation, the end walls 22 and 32 effectively prevent collapsing of the central and side feet 14 and 16 respectively of the pallet.

Extensive and severe tests of the disposable pallet 10 have demonstrated that it exceeds by wide margins the most severe acceptance tests imposed upon prior pallets by the large automobile companies who are extensive users of such pallets. One such automobile company tests the loading pallets in a shaking simulated freight car which oscillates violently and, with prior pallets, eventually causes the legs to shear off. The test imposed on prior pallets was to sustain a load of 800 pounds for three-quarters of an hour in the shaking freight car. In contrast, the present pallet sustained its load for one and one-half hours without showing any signs of collapsing, whereupon it was loaded to two thousand pounds and subjected to the same violent shaking for an additional half hour without collapsing. Thereupon the automobile company, which had originally intended it to be used for only light-weight shipments, certified it as acceptable for all shipments.

What I claim is:

1. A molded pallet, comprising
   a plate-shaped base having therein a plurality of sets of substantially rectangular openings disposed in laterally-spaced parallel relationship to one another, each set containing a plurality of such openings spaced longitudinally apart from one another and a plurality of sets of open-topped box-shaped feet of substantially equal height secured at their tops 2 and depending from said base directly beneath said openings, said tops of said feet being of sizes and shapes substantially corresponding to the sizes and shapes of said openings, said sets being disposed in laterally-spaced parallel relationship,
   each set including a plurality of said feet disposed substantially in alignment with one another in longitudinally-spaced relationship,
      each foot including opposite side walls and end walls and a bottom wall connected to one another along their adjacent edges,
   said base including lateral bridge portions disposed in the space between the feet of each set,
      said lateral bridge portions extending between the upper edges of the side walls of adjacent feet,
   said base also having longitudinal bridge portions extending between the end walls of the feet in each set thereof, said base along opposite edges of said openings having flaps extending downwardly therefrom into secured engagement with walls of their respective adjacent feet, said feet along opposite upper edges having horizontally-extending edge tabs secured to said base.

2. A molded pallet, according to claim 1, wherein said flaps are connected to the laterally-extending edges of said apertures and engage the opposite end walls of said feet.

3. A molded pallet, according to claim 1, wherein the bottom walls of the feet of said intermediate sets are wider than the bottom walls of said outer sets.

4. A molded pallet, according to claim 1, wherein said base comprises a plurality of plastic-impregnated sheets of fibrous sheet material adhesively secured to one another in face-to-face relationship.

References Cited by the Examiner

UNITED STATES PATENTS

| | | | |
|---|---|---|---|
| 2,706,099 | 4/1955 | Whalley | 108—53 |
| 2,903,218 | 9/1959 | Altenburg | 108—53 |
| 2,925,978 | 2/1960 | Marso | 108—56 |
| 2,953,339 | 9/1960 | Roshon | 108—56 |
| 2,996,276 | 8/1961 | Sorensen et al. | 108—57 |
| 3,046,187 | 7/1962 | Leitzel | 162—228 |
| 3,141,422 | 7/1964 | Woolworth | 108—56 |

FOREIGN PATENTS

| | | |
|---|---|---|
| 1,311,981 | 11/1962 | France. |
| 1,322,667 | 2/1963 | France. |

FRANK B. SHERRY, *Primary Examiner.*

G. O. FINCH, *Assistant Examiner.*